Oct. 27, 1942.                G. E. BREEZE                2,299,876
                        DIRECTION SIGNAL SWITCH
                        Filed Dec. 12, 1940
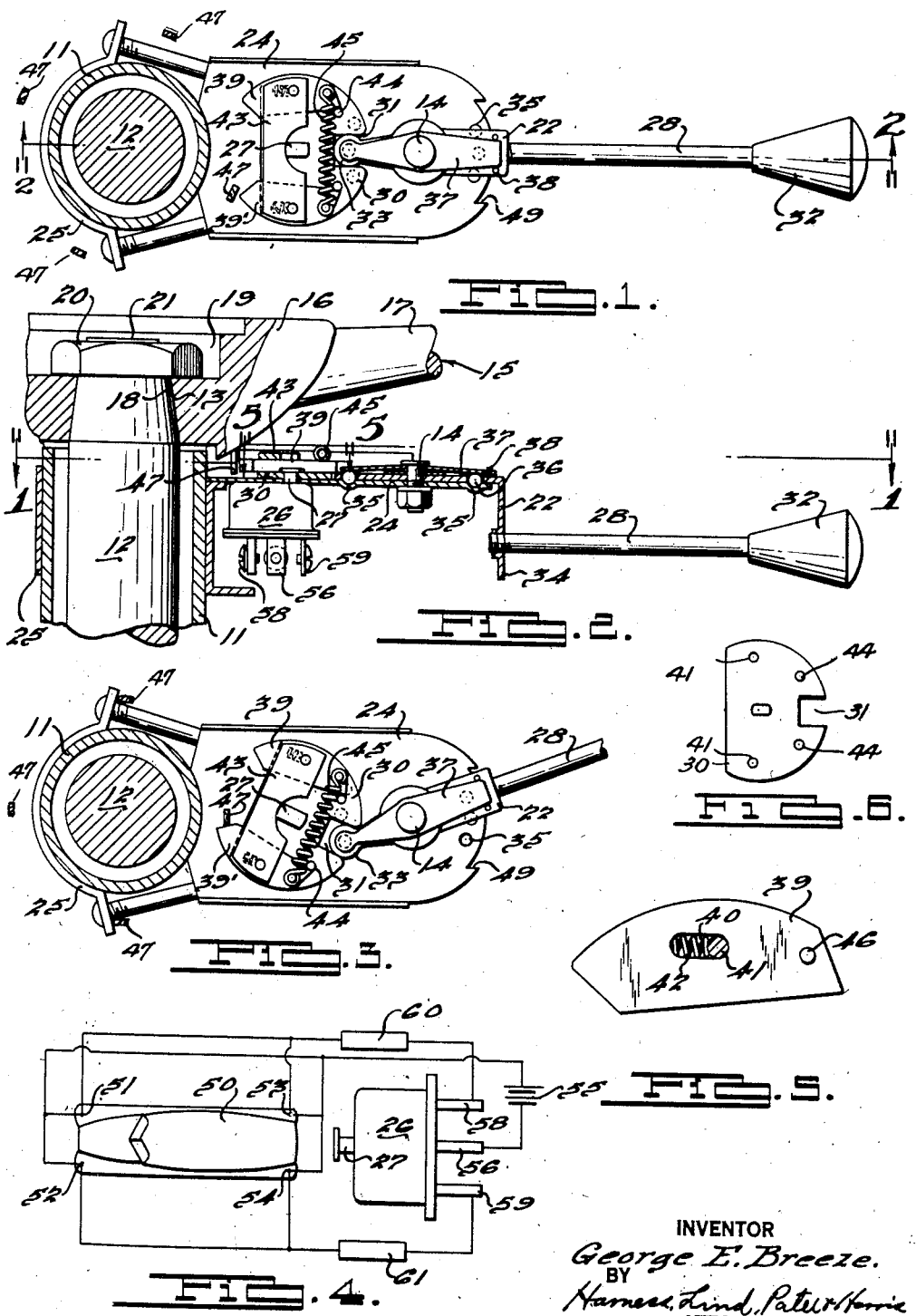
INVENTOR
George E. Breeze.
BY
ATTORNEYS Patented Oct. 27, 1942

2,299,876

UNITED STATES PATENT OFFICE 2,299,876

DIRECTION SIGNAL SWITCH

George E. Breeze, Highland Park, Mich., assignor to Chrysler Corporation, Highland Park, Mich., a corporation of Delaware Application December 12, 1940, Serial No. 369,791

4 Claims. (Cl. 200—59)

My invention relates to signal light switching mechainsms and more particularly to a device of this character which is adapted to be used on motor vehicles.

One object of my invention is to provide a new and improved switching mechanism for controlling the operation of directional signals.

An additional object is to provide a switch that is rugged and which will not easily get out of order, yet which is easy and cheap to manufacture.

A further object of my invention is to provide a switch which may be manually actuated prior to the turning movement of a motor vehicle and is automatically returned to its neutral position as soon as the turning movement of said vehicle has been completed.

A still further object is to provide in a switch mechanism of the aforesaid type, release means for releasing the mechanism in the event that the operating lever becomes stuck in one of its signalling positions thereby eliminating the possibility of having the steering mechanism rendered inoperative.

Further objects and advantages of my invention will be apparent from the following detailed description, reference being had to the accompanying drawing in which:

Fig. 1 is a plan view of the switch mechanism embodying my invention with the cover thereof removed, the section being taken on the line 1—1 of Fig. 2.

Fig. 2 is a sectional side elevational view of my invention, the section being taken on the line 2—2 of Fig. 1, and viewed in the direction indicated by the arrows.

Fig. 3 is a fragmentary plan view, partly in section, showing the mechanism in Fig. 1 in one of its operative positions.

Fig. 4 is a diagrammatic view of the electrical connections of the switch with relationship to the motor vehicle signal lights.

Fig. 5 is a detail view of a part of the switch control mechanism, taken on the line 5—5 of Fig. 2. Fig. 6 is a plan view of part of the switch mechanism.

Referring to the drawing, I have shown a steering column 11, surrounding a steering column shaft 12, the latter having a tapered top portion 13 adapted to be received by the hub 16 of a steering wheel generally indicated at 15. The latter comprises a hub 16 and spokes, one of which is shown at 17, which support a steering wheel rim, not shown. The steering wheel hub 16 is provided with a tapered hole 18 which is adapted to fit the tapered top portion 13 of the shaft 12, a counterbore 19 being provided in the hub for receiving a nut 20 threaded on the upper extremity 21 of the end portion 13 of the shaft 12 for securing the wheel 15 to the shaft.

A substantially rectangular supporting bracket 24 is securely held to the steering column shell 11 by a clamp 25. Mounted on the lower side of said bracket 24 is a switch 26 having a switch actuating shaft 27 which extends upwardly through an opening in the bracket 24. Rigidly secured to the shaft 27 is a substantially segmentally shaped plate 30 provided with an opening or recess 31.

Pivotally secured to the bracket 24 by means of a pin 14 is a switch actuating lever 22. The lever 22 is provided with a rounded end portion 33 which is received by the recess 31 and with a depending flange 34 in which is threaded a handle 26, the latter having a finger engaging knob 32 on its outer end.

The bracket 24 has a plurality of arcuately disposed depressions 35 formed in its upper surface which are adapted to receive detent balls 36 carried by suitably formed holes in the lever 22. The balls 36 are respectively retained in engagement with a pair of oppositely disposed depressions 35 under pressure of a leaf spring 37, the latter being retained in assembled relation by the head of the pin 14, a pair of pins 38 constraining the spring to movement along with the lever 22.

Carried on the plate 30 is a pair of dogs 39, 39'. The latter are each provided with a slot 40 (see Fig. 5) for engaging a pin 41 rigidly fixed in the plate 30. A coil spring 42 is disposed in each of the aforesaid slots and serves to yieldably resist sliding of the dog while permitting free pivoting of the same relative to the plate. The pins 41 are of greater height than the dogs and a bar 43 is fixed to the pins as illustrated, in such manner that it retains the dogs 39 and 39' and springs 41 in place without restricting sliding or pivoting of the dogs.

The plate 30 carries a pair of stop pins 44 against which the dogs 39, 39' are respectively urged by means of a tension spring 45 fastened at its ends to pins 46 carried respectively by the dogs.

In other words, the spring 45 tends to urge the dog 39 in a clockwise direction, and to urge the dog 39' in a counterclockwise direction, the sops 44 limiting the extent of such rotation. When the switch is in its left turn indicating position, as illustrated in Fig. 3, dog 39' is disposed in the path of a finger 47, of which there are several, depending from the steering wheel 15, and the balls 36 are disposed in one pair of the three spaced recesses 35, said recesses holding the switch lever 22 in one of its inclined positions, for energizing the signal lights on the left side of the car. As the steering wheel 15, and its depending finger 47 move in a counterclockwise direction to initiate the left hand turn, the finger 47 engages but passes by the dog 39' because of the small clockwise movement of the dog permitted by the spring 45. However, when the wheel 15 and finger 47 move in a clockwise direction as when the wheels are being restored to a straight ahead position after having completed the turn, the dog 39' is prevented from counter-clockwise movement by the stop 44 and the finger pushes the dog and also the switch back to its neutral position as illustrated in Fig. 1, thus automatically deenergizing the signalling system.

In Fig. 4, I have illustrated the electrical connection of the switch 26 with respect to the directional signal light system. I have shown diagrammatically a car 50, having forwardly visible signal lights 51 and 52 and rearwardly visible signal lights 53 and 54. A battery 55 has one terminal connected to each of the lights 51 to 54, inclusive, and its other terminal is connected to a central terminal 56 of the switch 26. The switch has two other contacts 58 and 59. The contact 58 is connected through a circuit interrupter 60 to the right light 51 and the rear light 53 on the right hand side of the car 50 and the contact 59 is connected through a circuit interrupter 61 to the lights on the left hand side of the car. Therefore, in operation, the inclination of the switch actuating handle 28 to the left as viewed in Fig. 3 will cause current to flow from the battery 55 through the terminal 56, the switch 26, the terminal 59 through the circuit interrupter 61, the signal lamps 52 and 54 on the left hand side of the car 50, and back to the battery 55, and thereby completing the signal circuit. It is understood that movement of the handle 28 to the right will cause the right hand lights to operate in a similar manner.

From the foregoing description it will be apparent that when the signal controlling knob 32 is in its neutral position, the dogs 39 and 39' are disposed out of the path of the steering wheel fingers 47, and that they move into the path of the fingers 47 only when the signal switch has been energized. Any amount of movement of the steering wheel in the direction indicated by the signal may occur without interference in any way with the switch. However, any movement of the steering wheel in the opposite direction immediately restores the switch to a neutral position. As a result, if the hand lever is accidentally set to indicate a right hand turn when a left hand turn is intended, the initial movement of the steering wheel toward making a left hand turn returns the switch to its neutral position, whereupon it may be reset properly by the operator. The signal may, of course, be returned to its neutral position manually, if desired.

Movement of the plate 30 relative to the bracket 24 is limited by engagement of the depending portion 34 of the lever 22 with the shoulders 49 formed on the bracket.

Should the switch actuating mechanism become stuck in one of its signalling positions, for example in the left turn position illustrated in Fig. 3, means is provided for releasing the dog 39', thus eliminating possibility of interference with the steering of the vehicle. This release means comprises the slot 40 and spring 42. So long as the switch mechanism is functioning normally, the respective dogs 39, 39' are retained in the positions illustrated by means of the springs 42, the only motion of the dogs being a pivotal movement about the pins 41 as permitted by the spring 45.

However, should the switch mechanism become stuck in one of its operative positions, such as left turn indicating position, the dog 39' will yield against the force of the spring 42 and slide relatively to the pin 41 and plate 30 under the pressure of the finger 47 sufficiently to permit the latter to pass by the dog. The spring 42 is of such weight that it will normally resist sliding of the dog and thus cause the finger 47 to move the mechanism back to neutral position upon reverse movement of the steering wheel. However, if abnormally high pressure is required to be exerted by the finger 47 on the reverse movement thereof, the dog will slide relatively to the plate and permit the finger 47 to pass without damage to the switch mechanism or to the steering mechanism and without interfering with the steering motion.

Although I have illustrated but one form of my invention and have described in detail but a single application thereof, it will be apparent to those skilled in the art that it is not so limited but that various modifications and changes may be effected therein without departing from the spirit of my invention or the scope of the appended claims.

I claim:

1. In a switch operating mechanism for direction signals, in combination, a double throw switch; lever means for actuating said switch; a pair of stops carried by said lever means; a pair of lugs pivotally and slidably carried by said lever means and engaging said stops; resilient means for urging said lugs against said stops; resilient means for preventing sliding of said lugs; an actuator adapted for movement to engage one of said lugs when the mechanism is in one of its signalling positions; the said actuator being so arranged with respect to said lugs that when moved in one direction it causes the lug to pivot against the resilient means and when moved in the opposite direction it causes the lug to move the mechanism back to neutral position or to slide against said last named resilient means.

2. In a switch operating mechanism for direction signals, in combination, a double throw switch; lever means for actuating said switch comprising a plate pivoted for oscillatory movement; a pair of stops carried by said plate; a pair of lugs slidably and pivotally mounted on said plate in engagement with said stops; resilient means carried by said plate for urging said lugs against said stops; resilient means for yieldably preventing sliding of said lugs; means for yieldably retaining said plate in switch operating position; an actuator adapted for movement to engage one of said lugs when the mechanism is in either of its switch operating positions; said actuator being adapted when moved in one direction to cause the lug to pivot against said resilient means and when moved in the opposite direction to move the mechanism back to neutral position or to slide against said last named resilient means.

3. In a switch operating mechanism for direction signals, in combination, a double throw switch; lever means for actuating said switch; a pair of stops carried by said lever means; a pair of lugs slidably and pivotally carried by said lever means and engaging said stops; resilient means for urging said lugs against said stops and for resisting sliding thereof; an actuator adapted for movement to engage one of said lugs when the mechanism is in one of its signalling positions; the said actuator being so arranged with respect to said lugs that when moved in one direction it causes the lug to pivot against the resilient means and when moved in the opposite direction it causes the lug to exert force against its stop whereby either the mechanism is moved to neutral position or the lug is caused to slide out of engagement with said actuator.

4. In combination with the vehicle steering wheel, direction signal control mechanism including a support; a double throw switch mounted on said support, said switch having an operating member protruding therefrom; a plate carried by said operating member; a switch lever carried by said support for actuating said plate; detent means carried by said support for yieldably holding said lever in neutral and in right and left turn indicating positions; right and left hand stops carried by said plate; right and left hand lugs pivotally and slidably carried on said plate in engagement with said stops; resilient means carried by said plate for urging said lugs against said stops and for preventing sliding thereof; an actuating lug carried by said steering wheel and so arranged with respect to the aforesaid lugs that it will engage one or the other thereof upon turning of said wheel when said mechanism is set to signal a turn.

GEORGE E. BREEZE.